(12) United States Patent
Yang et al.

(10) Patent No.: US 12,236,044 B2
(45) Date of Patent: Feb. 25, 2025

(54) ACCIDENTAL TOUCH PREVENTION METHOD, WEARABLE DEVICE, AND STORAGE MEDIUM

(71) Applicant: GOERTEK INC., Shandong (CN)

(72) Inventors: Zongxu Yang, Shandong (CN); Tao Sui, Shandong (CN); Guiming Cao, Shandong (CN); Shupeng Li, Shandong (CN); Shumin Tan, Shandong (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 18/563,486

(22) PCT Filed: Oct. 25, 2021

(86) PCT No.: PCT/CN2021/125961
§ 371 (c)(1),
(2) Date: Nov. 22, 2023

(87) PCT Pub. No.: WO2023/273038
PCT Pub. Date: Jan. 5, 2023

(65) Prior Publication Data
US 2024/0220053 A1 Jul. 4, 2024

(30) Foreign Application Priority Data

Jun. 30, 2021 (CN) .......................... 202110744374.4

(51) Int. Cl.
*G09G 5/00* (2006.01)
*G06F 3/041* (2006.01)
*G06F 3/044* (2006.01)

(52) U.S. Cl.
CPC .......... *G06F 3/04186* (2019.05); *G06F 3/044* (2013.01)

(58) Field of Classification Search
CPC ...... G06F 3/04186; G06F 3/044; G06F 3/014; G06F 3/0362; G06F 3/038; G06F 3/0304;
(Continued)

(56) References Cited

U.S. PATENT DOCUMENTS

2005/0205407 A1  9/2005 Hein et al.
2013/0335372 A1  12/2013 Wu
(Continued)

FOREIGN PATENT DOCUMENTS

CN  109088978 A  12/2018
CN  109710119 A  5/2019
(Continued)

OTHER PUBLICATIONS

International Search Report from International Application No. PCT/CN2021/125961 mailed Mar. 28, 2022.

*Primary Examiner* — Jennifer T Nguyen
(74) *Attorney, Agent, or Firm* — Shih IP Law Group, PLLC.

(57) ABSTRACT

Disclosed is an accidental touch prevention method applied to a wearable device including a touch control structure and a capacitive touch sensor configured to collect capacitance values of at least two touch channels. The distances between the touch channels and the touch control structure are not equal. The method includes: when an event of triggering a touch control structure is detected, obtaining a capacitance value of each touch channel collected by the capacitive touch sensor; determining whether the capacitance values of all of the touch channels meet a preset capacitance value distribution state which is the distribution state of the capacitance values of all of the touch channels when the touch control structure is triggered under the conditions of a non-accidental touch; and if not, determining that the touch control structure has been touched accidentally, and not (Continued)

responding to the event of triggering the touch control structure.

9 Claims, 4 Drawing Sheets

(58) Field of Classification Search
CPC .......... G06F 2203/04108; G06F 3/017; G04G 21/08
USPC ........................................................ 345/174
See application file for complete search history.

(56) References Cited

U.S. PATENT DOCUMENTS

| | | | |
|---|---|---|---|
| 2017/0010751 A1* | 1/2017 | Shedletsky | ............. G06F 1/163 |
| 2017/0090599 A1* | 3/2017 | Kuboyama | .......... H03K 17/962 |
| 2019/0015045 A1 | 1/2019 | Li | |
| 2019/0215611 A1 | 7/2019 | Lou et al. | |
| 2020/0012355 A1* | 1/2020 | Dashevsky | ............. G06F 3/014 |

FOREIGN PATENT DOCUMENTS

| | | | | |
|---|---|---|---|---|
| CN | 109792573 A | | 5/2019 | |
| CN | 112835462 | * | 11/2019 | ........... G06F 3/0412 |
| CN | 110673761 A | | 1/2020 | |
| CN | 110780769 A | | 2/2020 | |
| CN | 111176387 A | | 5/2020 | |
| CN | 211882558 U | | 11/2020 | |
| CN | 212460539 U | | 2/2021 | |
| CN | 112817491 A | | 5/2021 | |
| CN | 112835462 A | | 5/2021 | |
| CN | 113377237 A | | 9/2021 | |

\* cited by examiner

ACCIDENTAL TOUCH PREVENTION METHOD, WEARABLE DEVICE, AND STORAGE MEDIUM

The present disclosure claims a priority to the Chinese patent application No. 202110744374.4, titled "ACCIDENTAL TOUCH PREVENTION METHOD, WEARABLE DEVICE, AND STORAGE MEDIUM", filed with the China Patent Office on Jun. 30, 2021, the entire content of which is incorporated herein by reference.

TECHNICAL FIELD

The present disclosure pertains to a technical field of device control, and, particularly, to an accidental touch prevention method, a wearable device and a storage medium.

DESCRIPTION OF RELATED ART

With the development of smart wearable technology, wearable devices such as smart watches and smart bracelets have been widely used. Wearable devices are usually provided with touch control structures such as buttons, scroll wheels, knobs, and rotating crowns. User may realize human-computer interaction with wearable devices by pressing or rotating the touch control structures.

In practical use, accidental touch of the touch control structure caused by user's mis-manipulation usually occurs. For example, when a hand is supported by a table, the large area of the housing of a smart watch is in contact with skin and pressed, and accidental touch on the watch crown will occur at this time. In the related art, whether there is an accidental touch phenomenon is commonly determined by analyzing the user state (e.g., whether the wrist are raised, whether user is sleeping, etc.). However, since the scenario range covered by the accidental touch analysis according to the user state is relatively narrow, it is not possible to accurately identify the accidental touch phenomenon.

Therefore, a technical problem to be solved by those skilled in the art is how to improve the accuracy of accidental touch recognition.

SUMMARY

An objective of this disclosure is to provide an accidental touch prevention method, a wearable device and a storage medium, capable of improving the accuracy of accidental touch recognition.

In order to solve the above technical problem, the present disclosure provides an accidental touch prevention method which is applied to a wearable device, wherein the wearable device includes a touch control structure and a capacitive touch sensor configured to collect capacitance values of at least two touch channels whose distances from the touch control structure are not equal to one another, and wherein the accidental touch prevention method includes:
when an event of triggering the touch control structure is detected, obtaining a capacitance value of each of the touch channels collected by the capacitive touch sensor;
determining whether the capacitance values of all of the touch channels conform to a preset distribution state of capacitance value, the preset distribution state of capacitance value being a distribution state of the capacitance values of all of the touch channels when the touch control structure is triggered under a condition of non-accidental touch;
if not, determining that the touch control structure is accidentally touched, and not responding to the event of triggering the touch control structure.

Optionally, before obtaining the capacitance value of each of the touch channels collected by the capacitive touch sensor, the method further includes:
performing wearing detection for the wearable device;
if the wearable device is in the worn state, proceeding to obtaining the capacitance value of each of the touch channels collected by the capacitive touch sensor.

Optionally, obtaining the capacitance value of each of the touch channels collected by the capacitive touch sensor includes:
using the channel value of each of the touch channels collected by the capacitive touch sensor;
performing fitting according to a channel value range and the channel value of each of the touch channels to obtain the capacitance value corresponding to each of the touch channels, wherein the channel value range of each of the touch channels includes a maximum channel value and a minimum channel value.

Optionally, before determining whether the capacitance values of all of the touch channels conform to the preset distribution state of capacitance value, the method further includes:
collecting a reference capacitance value of each of the touch channels when the user triggers the touch control structure under the condition of non-accidental touch;
setting the preset distribution state of capacitance value according to the reference capacitance values of all of the touch channels.

The present disclosure further provides a wearable device, including: a touch control structure, a capacitive touch sensor and a master chip,
wherein the capacitive touch sensor is configured to collect capacitance values of at least two touch channels whose distances from the touch control structure are not equal to one another, and wherein the master chip is configured to obtain the capacitance value of each of the touch channels collected by the capacitive touch sensor when an event of triggering the touch control structure is detected, and is also configured to determine whether the capacitance values of all of the touch channels conform to the preset distribution state of capacitance value, the preset distribution state of capacitance value being a distribution state of the capacitance values of all of the touch channels when the touch control structure is triggered under the condition of non-accidental touch, and to determine, if not, that the touch control structure is accidentally touched, and not to respond to the event of triggering the touch control structure.

Optionally, the touch control structure includes a scroll wheel disposed on a side wall of a housing of the wearable device, and the at least two touch channels are disposed on the side wall of the housing.

Optionally, the touch control structure includes a scroll wheel and a button disposed on a side wall of a housing of the wearable device, wherein at least three of the touch channels are disposed on the side wall and at least one of the touch channel is disposed between the scroll wheel and the button.

Optionally, the button is provided with the touch channels disposed thereon.

Optionally, all of the touch channels are disposed on the same FPC board disposed on a side wall of a housing of the wearable device.

The present disclosure further provides a storage medium having computer-executable instructions stored thereon, wherein, when the computer-executable instructions are loaded and executed by a main control chip, steps of the accidental touch prevention method as described above are implemented.

The present disclosure provides an accidental touch prevention method which is applied to a wearable device, wherein the wearable device includes a touch control structure and a capacitive touch sensor configured to collect capacitance values of at least two touch channels whose distances from the touch control structure are not equal to one another, and wherein the accidental touch prevention method includes: when an event of triggering the touch control structure is detected, obtaining a capacitance value of each of the touch channels collected by the capacitive touch sensor; determining whether the capacitance values of all of the touch channels conform to a preset distribution state of capacitance value, the preset distribution state of capacitance value being a distribution state of the capacitance values of all of the touch channels when the touch control structure is triggered under a condition of non-accidental touch; and if not, determining that the touch control structure is accidentally touched, and not responding to the event of triggering the touch control structure.

The wearable device in the present disclosure includes a touch control structure and a capacitive touch sensor. The capacitive touch sensor may collect the capacitance values of at least two touch channels, the distances between each of the at least two touch channels and the touch control structure are not equal to one another, and the charge amount of the touch channel will thus be affected when the user is close to the touch channel. Therefore, when the touch control structure is triggered by the user without accidental touch, the user's influence on the capacitance values of the two touch channels is different, and then accidental touch recognition may be implemented based on the distribution state of the capacitance values of all touch channels. When an event of triggering the touch control structure is detected, the capacitance value of each of touch channels is collected by the capacitive touch sensor, and whether the capacitance values of all the touch channels conform to the preset distribution state of capacitance value is determined. If they do not confirm, it means that the touch control structure is detected to be accidentally touched, and no response is made to the event of triggering the touch control structure. The accidental touch prevention method of this embodiment may detect accidental touch phenomena in various scenarios and improve the accuracy of recognizing accidental touches. The present disclosure further provides a wearable device and storage medium having the above-described technical effect, which will not be duplicated here.

BRIEF DESCRIPTION OF DRAWINGS

In order to more clearly illustrate the technical solutions in the embodiments of the present disclosure or in the related art, the drawings that will be used in the description of the embodiments or the related art will be briefly introduced below. Obviously, the accompanying drawings in the following description are only a part of the present disclosure. For those skilled in the art, other drawings may also be obtained according to the provided drawings without inventiveness work.

DETAILED DESCRIPTIONS

The technical solution in the embodiments of the disclosure will be described by reference to the drawings in the embodiments of the present disclosure. Apparently, the described embodiments are only some of the embodiments of the present disclosure, but not all of them. Based on the embodiments of the present disclosure, all other embodiments derived by persons of ordinary skill in the art without creative work falls within the scope of the present disclosure.

With the development of smart wearable technology, conventional physical button methods are gradually unable to conform to requirement of user and scenario switching. Many manufacturers have introduced designs of touch control structure such as rotatable watch crowns, scroll wheels, and knobs. Since these touch control structures are prone to force and thus have an accidental triggering phenomenon, the scroll wheel, for example, is prone to force and causes accidental triggering of rolling (e.g., when a hand is supported by a table, a large area of the housing will in contact with skin and be pressed). The present application provides a new accidental touch prevention method of wearable devices through the following several embodiments, which may avoid the above-mentioned defects with a low-cost solution.

Hereinafter, reference will be made to FIG. 1, which is a schematic flowchart of an accidental touch prevention method provided by an embodiment of the present disclosure.

The method may specifically include:

S101: When an event of triggering a touch control structure is detected, obtaining a capacitance value of each of touch channels collected by a capacitive touch sensor.

Here, this embodiment may be applied to wearable devices such as smart watches, bracelets, augmented reality (AR) glasses or virtual reality (VR) helmets, and the above-described wearable devices may include the touch control structure, the capacitive touch sensor (Touch Integrated Circuit (IC)) and a master chip. The capacitive touch sensor is used to collect the capacitance values of at least two touch channels and return the collected capacitance values to the master chip, and the distances between each of the at least two touch channels of the capacitive touch sensor for collecting capacitance values and the touch control structure are not equal to one another. As a feasible implementation, the touch control structure and the touch channels may be disposed on the same side wall of the housing of the wearable device to improve the success rate of accidental touch prevention. Further, the capacitive touch sensor may be disposed in the master chip.

The touch control structure of this embodiment may include any of a button, a scroll wheel, a knob or a rotating crown, or combinations thereof. For example, the touch control structure may include a scroll wheel, or two buttons, or a button and a scroll wheel, etc. In this embodiment, the above-mentioned touch control structure may be triggered by pressing or rotation. The touch control structure is connected to the master chip, and the master chip may detect the event that the touch control structure is triggered by the user, while sending a data collection instruction to the capacitive touch sensor so as to obtain a capacitance value of each of touch channels collected by the capacitive touch sensor. It should also be noted that the button may be a common pressable button, or a pressable and rotatable key, and the scroll wheel may be a common rotatable scroll wheel, or a rotatable and pressable scroll wheel.

S102: Determining whether the capacitance values of all of touch channels conform to a preset distribution state of capacitance value; if yes, proceeding to S103; if not, proceeding to S104.

Here, before this step, there may also be an operation of determining the preset distribution state of capacitance value. The preset distribution state of capacitance value is a distribution state of the capacitance values of all of the touch channels when the touch control structure is triggered under a condition of non-accidental touch.

It may be understood that when the touch control structure is normally triggered by the user, the user's finger has a greater influence on the capacitance value of the touch channel closer to the touch control structure, so the accidental touch recognition may be implemented based on the distribution state of the capacitance value of the touch channel.

S103: Responding to the event of triggering the touch control structure.

Here, if the capacitance values of all of the touch channels conform to the preset distribution state of capacitance value, it means that there is non-accidental touch phenomenon. At this time, the master chip may respond to the event of triggering the touch control structure, such as screen wake-up, volume adjustment, answer to calls, etc., according to the preset processing logic.

S104: Determining that the touch control structure is accidentally touched, and not responding to the event of triggering the touch control structure.

Here, if the capacitance values of all of the touch channels do not conform to the preset distribution state of capacitance value, it means that there is an accidental touch phenomenon, and it is thus determined that the touch control structure is accidentally touched, and the event of triggering the touch control structure is not responded.

The wearable device in this embodiment includes the touch control structure and the capacitive touch sensor. The capacitive touch sensor may collect the capacitance values of at least two touch channels, the distances between each of the at least two touch channels and the touch control structure are not equal to one another, and the charge amount of the touch channel will be affected when the user is close to the touch channel. Therefore, when the touch control structure is triggered by the user without accidental touch, the user's influence on the capacitance values of the two touch channels is different, and then accidental touch recognition may be implemented based on the distribution state of the capacitance values of all touch channels. When an event of triggering the touch control structure is detected, the capacitive touch sensor collects the capacitance value of each of touch channels, and whether the capacitance values of all of the touch channels conform to the preset distribution state of capacitance value is touched. If they do not conform, it means that the touch control structure is detected to be accidentally touched, and no response is made to the event of triggering the touch control structure. The accidental touch prevention method of this embodiment may detect accidental touch phenomena in various scenarios and improve the accuracy of recognizing accidental touches.

Figure 1:
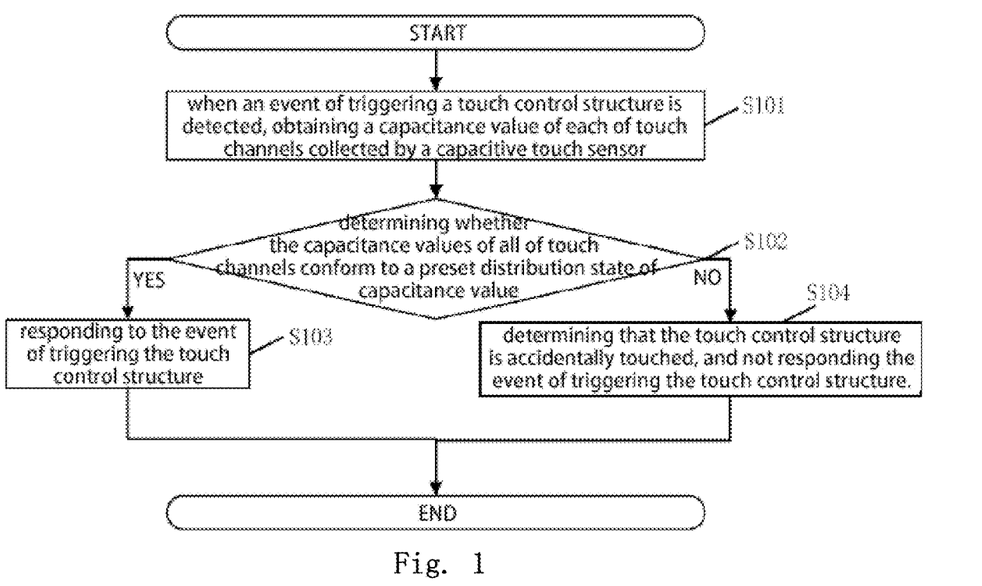
FIG. 1 is a schematic flowchart of an accidental touch prevention method provided by an embodiment of the present disclosure.

As a further explanation to the embodiment corresponding to FIG. 1, before obtaining the capacitance value of each of touch channels collected by the capacitive touch sensor, it is also possible to perform wearing detection for the wearable device. If the wearable device is in the worn state, it proceeds to step S101 of obtaining a capacitance value of each of touch channels collected by a capacitive touch sensor. In this way, the wearable device may execute the above-described accidental touch prevention method including S101 to S104 after the wearable device detects that it is normally worn by the user, thereby avoiding the logical confusion of the accidental touch prevention detection when the wearable device is not worn by the user. Specifically, the wearing detection may be implemented with the optical sensing of the bottom housing or capacitive sensing of the wearable device or may also be implemented by monitoring vital signs through the health module. Specifically, the wearing state data collected by the sensor may be used for wearing detection, wherein the wearing state data includes data collected by any one or more sensors of a vital sign sensor, a distance sensor, or a motion sensor. The vital sign sensor may be a sensor for detecting the heart rate of the wearer, may also be a sensor for detecting the body temperature of the wearer, or may be a sensor for detecting both the heart rate and the body temperature.

As a further explanation to the embodiment corresponding to FIG. 1, before obtaining the capacitance value of each of touch channels collected by the capacitive touch sensor, there may also be an operation of calibrating and setting a threshold for the capacitance value of each of touch channels.

Specifically, the maximum channel value Tmax and minimum channel value Tmin of each of touch channels may be obtained by using the channel values collected when the user's finger is not in contact with the touch channel and when the user's finger is completely in contact with the touch channel, and the range of channel values may be obtained by fitting the maximum channel value Tmax and minimum channel value Tmin of each touch channel. On the basis of this, the step of obtaining the capacitance value of each of touch channels collected by the capacitive touch sensor includes: using the channel value of each of the touch channels collected by the capacitive touch sensor; and performing fitting according to the channel value range and channel value of each of the touch channels to obtain the capacitance value corresponding to each of the touch channels, wherein the channel value range of the touch channel includes a maximum channel value Tmax and a minimum channel value Tmin.

Taking the range of the channel values from 0 to 255 as an example, the actual capacitance value S fitted with the current sampled channel values Ts after each of the touch channel is fitted is:

$$S = \frac{T_s - T_{min}}{T_{max} - T_{min}} \times 255.$$

As a further explanation to the embodiment corresponding to FIG. 1, before determining whether the capacitance values of all of the touch channels conform to the preset distribution state of capacitance value, the reference capacitance value of each of the touch channels when the user triggers the touch structure under non-accidental touch condition may also be collected, and the preset distribution state of capacitance value may be set according to the reference capacitance values of all of the touch channels. Specifically, in this embodiment, the preset distribution state of capacitance value may be determined according to the capacitance value range corresponding to the reference capacitance value ±10%. The preset distribution state of the capacitance value under the condition of non-accidental touch can be quickly determined in above-mentioned manner.

Figure 2:
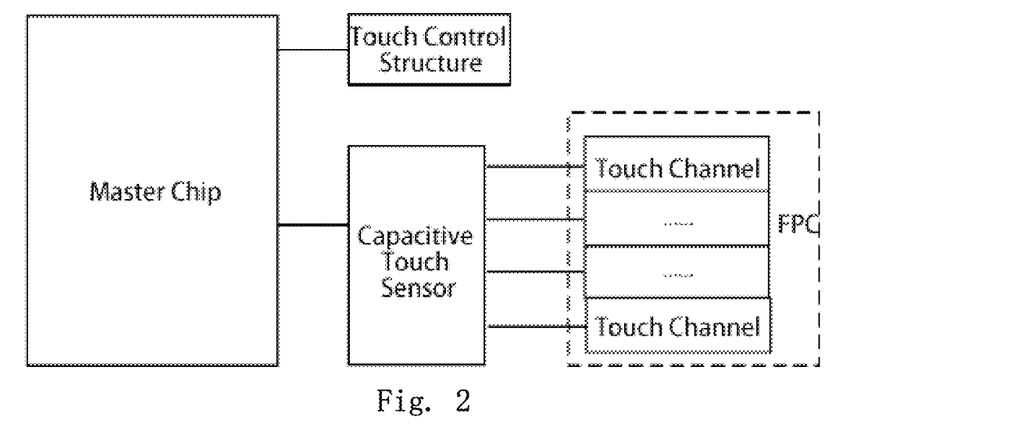
FIG. 2 is a schematic structural diagram of a wearable device provided by an embodiment of the present disclosure.

Reference will be made to FIG. 2, which is a schematic structural diagram of a wearable device provided by an embodiment of the present application. As illustrated in FIG. 2, the wearable device may include a touch control structure, a capacitive touch sensor and a master chip.

Here, the capacitive touch sensor is used to collect the capacitance values of at least two touch channels (i.e. touch channels), and the distances between each of the at least two touch channels and the touch control structure are not equal to one another. The master chip is used to obtain the capacitance value of each of the touch channels collected by the capacitive touch sensor when an event of triggering the touch control structure is detected, and is also used to determine whether the capacitance values of all of the touch channels conform to the preset distribution state of capacitance value, wherein the preset distribution state of capacitance value is a distribution state of the capacitance values of all of the touch channels when the touch control structure is triggered under the condition of non-accidental touch. If not, then the master chip determines that the touch control structure is accidentally touched and does not respond to the event of triggering the touch control structure.

The wearable device in this embodiment includes a touch control structure and a capacitive touch sensor. The capacitive touch sensor may collect the capacitance values of at least two touch channels, the distances between each of the at least two touch channels and the touch control structure are not equal to one another, and the charge amount of the touch channel will be affected when the user is close to the touch channel. Therefore, when the touch control structure is triggered by the user without accidental touch, the user's influence on the capacitance values of the two touch channels is different, and then accidental touch recognition may be implemented based on the distribution state of the capacitance values of all touch channels. When an event of triggering the touch control structure is detected, the capacitive touch sensor collects the capacitance value of each of touch channels, and whether the capacitance values of all of the touch channels conform to the preset distribution state of capacitance value is determined. if they do not conform, it means that the touch control structure is detected to be accidentally touched, and no response is made to the event of triggering the touch control structure. The accidental touch prevention method of this embodiment may detect accidental touch phenomena in various scenarios and improve the accuracy of recognizing accidental touches.

Figure 3:
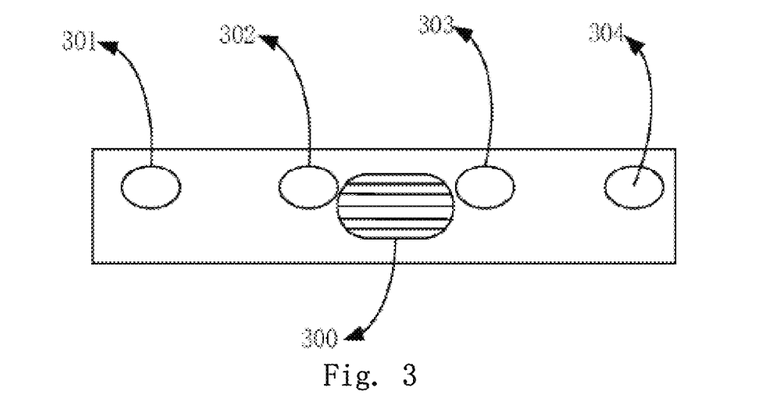
FIG. 3 is a schematic diagram of the position of a first touch channel provided by an embodiment of the present disclosure.

As a feasible implementation, the above-described touch control structure may include a scroll wheel disposed on a side wall of the housing of the wearable device, at least two touch channels being disposed on the side wall. Further, the number and arrangement positions of the touch channels affect the accuracy of accidental touch prevention. Reference will be made to FIG. 3, which is a schematic diagram of the position of the first touch channel provided by an embodiment of the present application. This embodiment uses a four-touch channel design. Touch channel 302 and touch channel 303 are disposed on the respective opposite sides of the scroll wheel 300, and both the touch channel 302 and the touch channel 303 are closer to the scroll wheel 300 than touch channel 301 and touch channel 304. The touch channel 302 and the touch channel 303 are referred to as near-side capacitors of the scroll wheel. The touch channel 301 and the touch channel 304 are disposed on respective opposite sides of the scroll wheel 300 and are referred to as far-side capacitors of the scroll wheel. Optionally, the touch channels may be positioned as close to the screen as possible to reduce the influence of the wrist skin on the capacitance value. The touch channel 302 and the touch channel 303 is positioned as close to the scroll wheel as possible, and the touch channel 301 and the touch channel 304 is positioned as far away from the scroll wheel as possible so as to achieve better distinction between the near-side capacitors of the scroll wheel and the far-side capacitors of the scroll wheel.

The rotation direction of the scroll wheel 300 may be provided in various forms, and the rotation axis of the scroll wheel may be parallel to the plane where the side wall of the housing on which the scroll wheel is disposed or parallel to the tangent plane of the side wall of the housing. For example, when the housing of the wearable device is approximately rectangular, the rotation axis of the scroll wheel may be parallel to the side wall, and specifically to its longer or shorter side, of the housing on which the scroll wheel is disposed; when the housing of the wearable device is approximately circular, the rotation axis of the scroll wheel may be parallel to the tangent plane of the side wall of the housing on which the scroll wheel is disposed.

The touch channel 301, the touch channel 302, the touch channel 303 and the touch channel 304 are distributed along the circumferential direction of the side wall of the housing. Here, when the rotation axis of the scroll wheel 300 is parallel to the longer side of side wall of the housing, the touch channel 301, the touch channel 302, the touch channel 303 and the touch channel 304 are distributed along the rotation axis of the scroll wheel.

Figure 4:
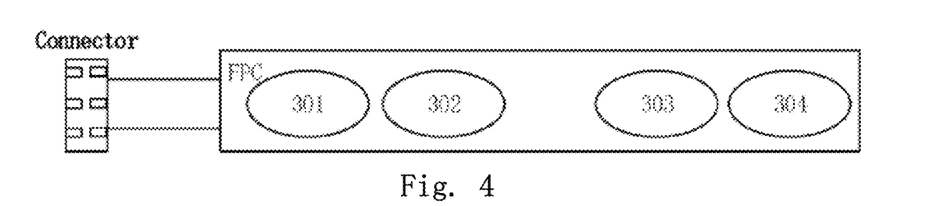
FIG. 4 is a schematic flowchart of a Flexible Printed Circuit (FPC) layout of a touch channel provided by an embodiment of the present disclosure.

Reference will be made to FIG. 4, which is a schematic diagram of the FPC layout of a touch channel provided by an embodiment of the present application. All of the touch channels are disposed on the same FPC board, and the FPC board is disposed on the side wall of housing of the wearable device. The FPC board may be connected, in a manner of a connector, to the capacitive touch sensor on the hard board and the master control unit. After receiving and processing data of multiple channels, the capacitive touch sensor transmits the processed data to the master chip.

Figure 5:
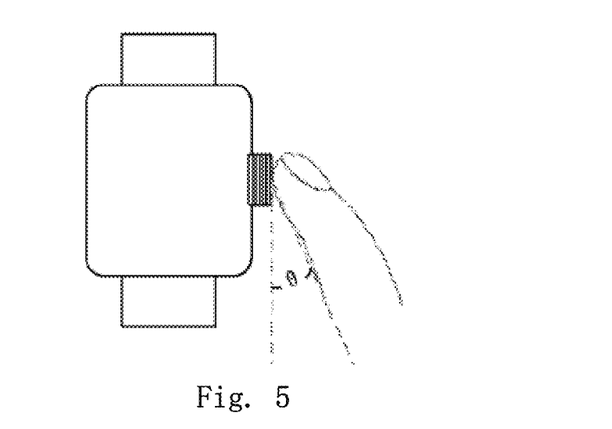
FIG. 5 is a schematic diagram of a user-triggered touch structure provided by an embodiment of the present disclosure.

Taking smart watch as an example, the schematic diagram of the touch control structure triggered by the user under the condition of non-accidental touch is shown in FIG. 5. θ in FIG. 5 refers to the angle between the user's finger and the side wall of the housing of the watch, and θ may be set according to user's normal habits. Taking four touch channels as an example, when the user's finger normally rotates the scroll wheel, the values S1, S2, S3, and S4 are those actually collected by each of the touch channels (that is, the preset distribution state of the capacitance value). During the test, the user may be guided to test with normal operating habits by means of Apps or the like. Since distance between the each of the four touch channels and the finger is different during normal use of the user, the obtained values of S1, S2, S3, and S4 are different from one another.

The principle of accidental touch determination based on the solution shown in FIG. 4 is as follows: when the user operates normally, the data collected by the four touch channels should be distributed near S1, S2, S3, and S4, and the value at the side near the scroll wheel will be significantly higher than the value at the side far from the scroll wheel. Meanwhile, when an accidental touch occurs, e.g., when hand is supported by table, a large area of the side wall of the housing is in contact with the skin, which will cause each of the four channels to have high values and the logic of data distribution is not fixed. Therefore, the condition for determining whether there is an accidental touch is as follows: in case that the data collected by each of the four channels is within ±10% of the range of S1, S2, S3, and S4, it is regarded as a normal trigger, and in case of other data distribution, it is regarded as an accidental trigger. The percentage of the above-described channel values may be adjusted according to the specific test results of the product and may not be limited to 10%.

This embodiment provides an accidental touch prevention design based on capacitance value detection, which adopts a side sensing capacitance design of multiple touch channels, and can effectively distinguish user operations from accidental trigger scenarios by signal collection and corresponding software control logic.

Figure 6:
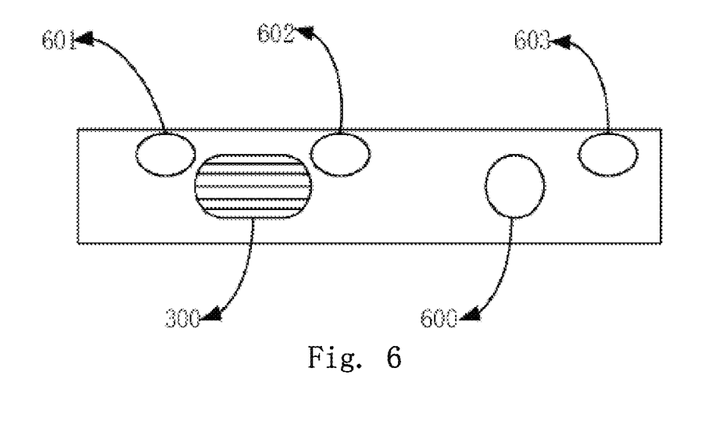
FIG. 6 is a schematic diagram of the position of a second touch channel provided by an embodiment of the present disclosure.

As another feasible implementation, the touch control structure includes a scroll wheel and a button disposed on the side wall of the housing of the wearable device. At least three touch channels are disposed on the side wall of the housing, and at least one touch channel is disposed between the scroll wheel and the button. Reference will be made to FIG. 6, which is a schematic diagram of the position of a second-type touch channel provided by an embodiment of the present application. This embodiment uses a three-touch-channel design in which the corresponding position of the touch channel is shown in FIG. 3, and three capacitive touch channels are provided. Among them, the touch channel 601 and the touch channel 602 are located on opposite sides of the scroll wheel 300 and are closer to the scroll wheel 300 than the touch channel 603 is. The touch channel 601 is located on a side of the scroll wheel 300 away from the key 600. The touch channel 602, which is referred to as near-side capacitor of the scroll wheel, is located between the scroll wheel 300 and the key 600, and the touch channel 603, which is referred to as far-side capacitor of the scroll wheel, is located on a side of the key 600 away from the scroll wheel 300. The touch channel, when being designed, may be positioned as close to the screen as possible to reduce the influence of the wrist skin on the capacitance value. The touch channel 601 and touch channel 602 may be positioned as close to the scroll wheel as possible, and the touch channel 603 may be positioned as far away from the scroll wheel as possible to achieve better distinction between the near-side capacitor of the scroll wheel and the far-side capacitor of the scroll wheel. The touch channel may be arranged on the same FPC, attached to the side wall of the housing of the watch, and connected to the capacitive touch sensor on the hard board and the master control unit in a manner of connector. The capacitive touch sensor, after receiving and processing data of multiple channels, transmits the processed data to the master chip.

As to the three-channel design of the present invention, it is possible to calibrate and set a threshold for the capacitance value of each of touch channels. First, it may be necessary to collect the values of each of the channels in case of no contact and in case of complete contact as the maximum value Tmax and the minimum value Tmin within the range of each channel. Then each of the channels is fitted, that is, the maximum value and minimum value are fitted to 0 and the maximum value of the range. Taking the range of the channel values from 0 to 255 as an example, the actual value S fitted with the sampled data Ts after each of the touch channel is fitted is:

$$S = \frac{T_s - T_{min}}{T_{max} - T_{min}} \times 255.$$

When the record is in normal use, the scroll wheel may be rotated by the user's fingers normally, and the values S1, S2, and S3 actually collected by each of the channels may be obtained. During the test, users may be guided to test with normal operating habits by means of Apps or the like, so that the user may perform the test in the manner as shown in FIG. 5 to obtain S1, S2, and S3. Since distances between the each of the three touch channels and the finger are different during normal use of the user, the values of S1, S2, and S3 are different from one another.

The logic of accidental triggering and normal triggering is as follows: when the user operates normally, the data collected by the three channels should be distributed near S1, S2, and S3, and the value at the side near the scroll wheel will be significantly higher than the value at the side far from the scroll wheel. Meanwhile, when an accidental touch occurs, such as when hand is supported by table, a large area of the side wall of the housing is in contact with the skin, which will cause each of the three channels to have high values, and the logic of data distribution is not fixed. Therefore, the condition for determining whether there is an accidental touch is as follows: in case that the data collected by each of the three channels is within ±10% of the range of S1, S2, S3, and S4, it is regarded as a normal trigger, and in case of other data distribution, it is regarded as an accidental trigger.

When the interval between the position of the button and the position of the scroll wheel is large, the far-side capacitive channel may be placed on the button. At this time, the button may be extended into a two-in-one button combining physical and touch controls, which may achieve more control methods. In this application, the value of the above-described S3 may be corrected.

This embodiment is designed for watches or bracelets with side scroll wheel, and adopts a three-channel side-sensing capacitance design, and can effectively distinguish user operations from accidental trigger scenarios by signal collection and corresponding software control logic.

Since embodiments of the device corresponds to the embodiments of the method, the description of the embodiments of the method will be described with reference to the embodiments of the device, which will not be duplicated herein.

The present application further provides a storage medium having computer programs stored thereon. When the computer program is executed, the steps provided in the above-mentioned embodiments can be implemented. The storage medium may include various media capable of storing program codes, such as U disk, removable hard disk, a read-only memory (Read-Only Memory, ROM), a random access memory (Random Access Memory, RAM), magnetic disk or optical disk.

Various embodiments in the description are described in a progressive manner, each of the embodiments focuses on the differences from other embodiments, and the same and similar parts of each embodiment may be referred to each other. As for the devices disclosed in the embodiment, the description is relatively simple because that it corresponds to the method disclosed in the embodiment, and its relevant details may refer to the corresponding description of the method. It should be indicated that, several modifications, and variations to the application can be made by those skilled in the art without departing from the principles of the present application, which fall within the protection scope of the claims of the present application.

It should be noted that, in this specification, relational terms such as first and second are only used to distinguish one entity or operation from another entity or operation, and do not necessarily require or imply that there is any such actual relationship or order between these entities or operations. Furthermore, the term "comprising", "including" or any other variation thereof is intended to cover a non-exclusive inclusion such that a process, method, article, or apparatus comprising a set of elements includes not only those elements, but also elements not expressly listed, or elements inherent in the process, method, article, or apparatus. Without further limitations, an element defined by the phrase "comprising a . . . " does not preclude the presence of additional identical elements in the process, method, article or apparatus comprising that element.

What is claimed is:

1. An accidental touch prevention method which is applied to a wearable device, wherein the wearable device comprises a touch control structure and a capacitive touch sensor configured to collect capacitance values of at least two touch channels whose distances from the touch control structure are not equal to one another, and wherein the accidental touch prevention method comprises:
   when an event of triggering the touch control structure is detected, obtaining a capacitance value of each of the touch channels collected by the capacitive touch sensor;
   determining whether the capacitance values of all of the touch channels conform to a preset distribution state of capacitance value, the preset distribution state of capacitance value being a distribution state of the capacitance values of all of the touch channels when the touch control structure is triggered under a condition of non-accidental touch; and
   if not, determining that the touch control structure is accidentally touched, and not responding to the event of triggering the touch control structure,
   wherein the obtaining the capacitance value of each of the touch channels collected by the capacitive touch sensor comprises:
      using the channel value of each of the touch channels collected by the capacitive touch sensor; and
      performing fitting according to a channel value range and the channel value of each of the touch channels to obtain the capacitance value corresponding to each of the touch channels, wherein the channel value range of each of the touch channels comprises a maximum channel value and a minimum channel value.

2. The accidental touch prevention method according to claim 1, wherein before obtaining the capacitance value of each of the touch channels collected by the capacitive touch sensor, the method further comprises:
   performing wearing detection for the wearable device; and
   if the wearable device is in a worn state, proceeding to obtaining the capacitance value of each of the touch channels collected by the capacitive touch sensor.

3. The accidental touch prevention method according to claim 1, wherein before determining whether the capacitance values of all of the touch channels conform to the preset distribution state of capacitance value, the method further comprises:
   collecting a reference capacitance value of each of the touch channels when a user triggers the touch control structure under a condition of non-accidental touch; and
   setting the preset distribution state of capacitance value according to the reference capacitance values of all of the touch channels.

4. A storage medium having computer-executable instructions stored thereon, wherein, when the computer-executable instructions are loaded and executed by a main control chip, steps of the accidental touch prevention method according to claim 1 are implemented.

5. A wearable device, comprising: a touch control structure, a capacitive touch sensor and a master chip,
   wherein the capacitive touch sensor is configured to collect capacitance values of at least two touch channels whose distances from the touch control structure are not equal to one another, and
   wherein the master chip is configured to obtain, when an event of triggering the touch control structure is detected, the capacitance value of each of the touch channels collected by the capacitive touch sensor, by using the channel value of each of the touch channels collected by the capacitive touch sensor and performing fitting according to a channel value range and the channel value of each of the touch channels, wherein the channel value range of each of the touch channels comprises a maximum channel value and a minimum channel value, and
   wherein the master chip is also configured to determine whether the capacitance values of all of the touch channels conform to the preset distribution state of capacitance value, the preset distribution state of capacitance value being a distribution state of the capacitance values of all of the touch channels when the touch control structure is triggered under the condition of non-accidental touch, and to determine, if not, that the touch control structure is accidentally touched, and not to respond to the event of triggering the touch control structure.

6. The wearable device according to claim 5, wherein the touch control structure comprises a scroll wheel disposed on a side wall of a housing of the wearable device, and the at least two touch channels are disposed on the side wall of the housing.

7. The wearable device according to claim 5, wherein the touch control structure comprises a scroll wheel and a button disposed on a side wall of a housing of the wearable device, wherein at least three of the touch channels are disposed on the side wall and at least one of the touch channel is disposed between the scroll wheel and the button.

8. The wearable device according to claim 7, wherein the button is provided with the touch channels disposed thereon.

9. The wearable device according to claim 5, wherein all of the touch channels are disposed on the same FPC board disposed on a side wall of a housing of the wearable device.

* * * * *